(No Model.)
C. D. HOWARD.
AUTOMATIC DAMPER REGULATOR.
No. 488,895. Patented Dec. 27, 1892.
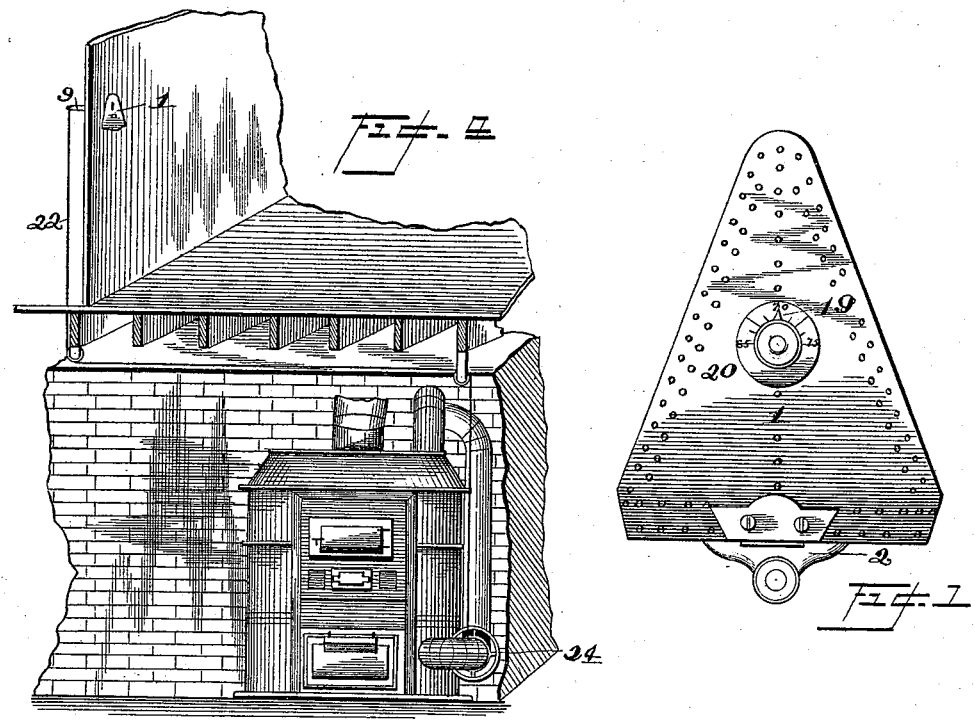
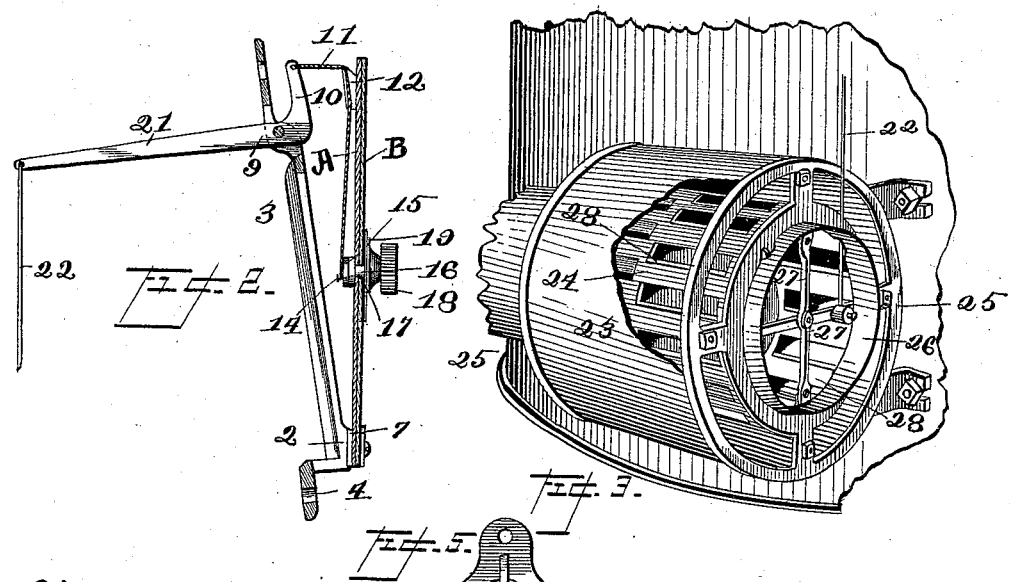
Witnesses:
Edward Wells.
T. W. Johnson.
Inventor:
Chas. D. Howard
By J. R. Nottingham
Atty.

UNITED STATES PATENT OFFICE.

CHARLES D. HOWARD, OF SYRACUSE, NEW YORK, ASSIGNOR TO THE HOWARD THERMOSTAT COMPANY, OF SAME PLACE.

AUTOMATIC DAMPER-REGULATOR.

SPECIFICATION forming part of Letters Patent No. 488,895, dated December 27, 1892.

Application filed November 30, 1892. Serial No. 453,568. (No model.)

*To all whom it may concern:*

Be it known that I, CHARLES D. HOWARD, a citizen of the United States, residing at Syracuse, in the county of Onondaga and State of New York, have invented certain new and useful Improvements in Automatic Draft-Regulators; and I do hereby declare the following to be a full, clear, and exact description of the invention, such as will enable others skilled in the art to which it appertains to make and use the same.

This invention relates to certain improvements in thermostatic devices for automatically regulating the temperature in rooms or apartments deriving their heat from a suitable heating apparatus, or furnace, and it has for its objects, primarily, to provide a thermostat that will be extremely sensitive in its action and which will act positively to move the draft regulating damper to control the combustion, and also to provide, in connection with said thermostat, suitable mechanism for accurately operating the damper, and which can be adjusted so as to be operated when the temperature in the room in which the thermostat is situated reaches any predetermined point, as more fully hereinafter explained.

The improved thermostat consists essentially of a thermostatic-plate constructed of two contiguous sheets of material of different expansible properties, the said plate being formed with a broad base which is securely fastened to any suitable support, and a gradually narrowed body, the end opposite the base being free to move under the expansion and contraction of the thermostatic-plate so as to permit the damper to move automatically, in one direction as the thermostatic-plate is expanded, and to move it positively in the opposite direction as the said plate contracts under changes of temperature, as will be more fully hereinafter specified.

The invention further consists in the combination with the thermostatic plate of certain mechanism connecting the same with a damper, whereby the damper may be automatically operated by the expansion and contraction of the plate as more fully hereinafter set forth; and the invention finally consists in the combination and arrangement of the thermostatic-plate, the operating mechanism and the damper as more fully hereinafter set forth.

In the accompanying drawings, making part of this specification:—Figure 1 represents a front elevation of the improved thermostat detached. Fig. 2 represents a vertical section of the thermostat. Fig. 3 represents a perspective view of a damper. Fig. 4 a sectional view of a structure, showing two compartments in which the thermostat and heating apparatus are located, respectively, and Fig. 5 a detail view of the upper part of the standard.

Referring to the drawings, the numeral 1 indicates a thermostatic-plate, which is constructed of two contiguous sheets of material having different expansible properties. By preference sheet iron, as A, and hard rubber or vulcanite, as B, are employed for the purpose. These sheets are firmly united by rivets or otherwise and are of such shape as to afford a broad base, capable of being rigidly fastened to any suitable support, the body of the thermostatic-plate being gradually narrowed to an apex with which the damper controlling mechanism is connected. In the present instance the thermostatic-plate is represented as of tri-angular shape, and has its base secured to the base 2 of a vertical standard 3, which is about equal in length to the height of the thermostatic-plate. The base of the standard is perforated as indicated by the numeral 4 so that it may be attached, by means of a screw, to the wall of the room, or apartment in which the thermostat is located. At the base of the thermostatic-plate, is, preferably, located a transverse bar 7, which increases its rigidity, without materially adding to its weight, or impairing its power of contraction and expansion. The thermostatic-plate is fastened to the front of the standard, so that its upper free end, under the influence of expansion and contraction, will move to and from the upper end of said standard. The upper end of the standard is provided with an opening or slot 8, having bearings at each side, between which is adjustably fulcrumed a bell crank lever 9; to the short, vertical arm 10 of which is secured one end of a short link or chain 11, the said chain passes through a guide 12, fastened to the apex or narrow upper end of the thermostatic-plate and is secured to the wrist-pin 14, of a short crank-arm 15, secured to the inner end of a short shaft 16, passing through a bearing 17, at about the center of the thermostatic-plate, the front end of the shaft being provided with a knob 18, and a pointer 19, the latter being adapted to move over a scale 20 on the front face of the thermostatic-plate. By turning the shaft, the chain is shortened or lengthened to set the thermostat so as to operate at a predetermined or desired temperature. To the long or horizontal arm 21 of the lever is attached one end of a cord or extension 22, the other end of which is connected with the damper to be controlled by the thermostat.

The damper may be of any suitable construction, but is, preferably, in the form shown in the drawings, in which the numeral 23 indicates an outer air casing, which is of cylindrical shape and constructed of any suitable material. The numeral 24 indicates an outer cylinder which is supported concentrically and longitudinally within the casing proper by means of the annularly slotted heads 25, fitted upon the ends of the outer casing. The heads are provided with outwardly extending annular flanges 26, to which may be fitted the pipes leading to the ash pit and the escape flue of the furnace respectively, as indicated in Fig. 3 of the drawings. The outer cylinder is provided with two sets of peripheral, longitudinal slots extending from near each end to near the center of said cylinder; those at one end being, alternately, out of line, longitudinally, with those at the other, for the purpose more fully hereinafter explained. The heads are provided with diametrical cross bars 27, which have central bearings for the axial journals of the damper cylinder 28, which is located and adapted to partly rotate within the outer cylinder, before mentioned. The said damper cylinder is slotted to correspond with the slots in the outer-cylinder, the slots, however, being so disposed, that while those at one end are registering with the slots at one end of the outer cylinder, the slots at the other end are out of registration with those at the other end of the outer cylinder and vice versa. One side of the damper cylinder is weighted, so as to hold the check side of the damper open, and to this weighted side is attached the end of the cord or connection, connecting the long arm of the thermostat lever with said damper.

This specific form of damper is shown, described and claimed in an application filed by me November 16, 1891, Serial No. 412,040.

The operation of the invention is as follows:—The thermostat and furnace being arranged as shown in Fig. 4 of the drawings, and the thermostat being properly adjusted, when the temperature in the room in which the thermostat is situated, rises above the predetermined degree, the thermostatic-plate will be expanded on the outside and its upper end turned toward the supporting bracket, allowing the damper to drop on its weighted side, so as to gradually open the damper openings leading to the flue which enters above the fire line, so as to retard combustion, at the same time closing the draft or opposite damper apertures. When the temperature is reduced, the thermostatic-plate contracts, its upper end draws away from the bracket, and the damper is, positively, drawn in the opposite direction.

It will be perceived, that as thus constructed, with a broad base and narrow apex, a large and effective heating surface is provided at the lower part of the thermostatic-plate, by which it is rendered extremely sensitive to changes of temperature, while at the same time, by reason of the broad base, a powerful contractile body is obtained.

Having thus described my invention, I claim and desire to secure by Letters Patent:—

1. A thermostatic plate consisting of two contiguous sheets of material of different expansible properties said plate having a broad base fixed to a suitable support, and a gradually narrowed body in combination with the damper operating mechanism connected to the narrow end of the plate, substantially as described.

2. A thermostatic plate, consisting of two contiguous sheets of material of different expansible properties, said plate having a broad base fixed to a suitable support and a gradually narrowed body, a supporting standard to the base of which, the base of the thermostatic plate is securely fastened a bell crank lever fulcrumed to the upper end of the standard and a link or chain connecting the short arm of said lever to the apex of the thermostatic plate, substantially as specified.

3. The combination with the tri-angular thermostatic plate, the standard to which it is secured at its base and the bell crank lever and its connecting link or chain, of the crank shaft having a bearing in the thermostatic plate and a knob and index at its outer end and the chain connecting the crank with the apex of said plate, whereby the thermostat may be set to operate at a pre-determined or desired temperature, substantially as described.

4. The combination with the supporting standard, the tri-angular thermostatic plate secured to the same at its base and the bell crank lever and link connecting the short arm with the apex of the plate, of the damper connected to the long arm of said lever, by a suitable cord or connection, so as to automatically drop as the thermostatic plate expands, and be moved positively by the contraction of said plate, substantially as specified.

In testimony whereof I do affix my signature in the presence of two witnesses.

CHARLES D. HOWARD.

Witnesses:
F. H. MOORE,
J. R. NOTTINGHAM.